(12) United States Patent
Ikeda

(10) Patent No.: US 6,731,475 B2
(45) Date of Patent: May 4, 2004

(54) CURRENT-PERPENDICULAR-TO-THE-PLANE STRUCTURE ELECTROMAGNETIC TRANSDUCER ELEMENT HAVING REDUCED PATH FOR ELECTRIC CURRENT

(75) Inventor: Junya Ikeda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 167 days.

(21) Appl. No.: 09/951,102

(22) Filed: Sep. 12, 2001

(65) Prior Publication Data

US 2002/0154453 A1 Oct. 24, 2002

(30) Foreign Application Priority Data

Apr. 18, 2001 (JP) .......................................... 2001-119067

(51) Int. Cl.[7] ................................................ G11B 5/39
(52) U.S. Cl. ..................................... 360/322; 360/324.2
(58) Field of Search ............................ 360/324–324.2, 360/322

(56) References Cited

U.S. PATENT DOCUMENTS 5,784,224 A * 7/1998 Rottmayer ................... 360/324
6,381,107 B1 * 4/2002 Redon ...................... 360/324.2
6,512,660 B1 * 1/2003 Li ............................... 360/324

FOREIGN PATENT DOCUMENTS

| JP | 06-068426 | 3/1994 |
| JP | 07-105513 | 4/1995 |
| JP | 07-220240 | 8/1995 |
| JP | 10-55512 | 2/1998 |
| JP | 11-195207 | 7/1999 |
| JP | 2000-036110 | 2/2000 |

* cited by examiner

Primary Examiner—A. J. Heinz
(74) Attorney, Agent, or Firm—Greer, Burns & Crain, Ltd.

(57) ABSTRACT

A current-perpendicular-to-the-plane (CPP) structure electromagnetic transducer element comprises upper and lower electrically-conductive lead layers. The lead layers are employed to supply an electric current to an electromagnetic transducer film. An electrically-conductive terminal piece is allowed to stand on the surface of the lower electrically-conductive lead layer. The contact established between the electrically-conductive terminal piece and the electromagnetic transducer film is allowed to define the path for the electric current. The reduced contact area of the electrically-conductive terminal piece contributes to reduction in the size or extent of the path for the electric current through the electromagnetic transducer film. The path of the electric current can be reduced in the CPP structure electromagnetic transducer element without relying on reduction in the size of the electromagnetic transducer film.

5 Claims, 9 Drawing Sheets

FIG.27

CURRENT-PERPENDICULAR-TO-THE-PLANE STRUCTURE ELECTROMAGNETIC TRANSDUCER ELEMENT HAVING REDUCED PATH FOR ELECTRIC CURRENT

BACKGROUND OF THE INVENTION

1. Field of the Invention

The present invention relates to a current-perpendicular-to-the-plane (CPP) structure electromagnetic transducer element comprising an electromagnetic transducer film such as a spin valve magnetoresistive film or a tunnel-junction magnetoresistive film, and upper and lower electrically-conductive lead layers interposing the electromagnetic transducer film in the vertical direction perpendicular to the electromagnetic transducer film.

2. Description of the Prior Art

A single domain property should be established in the free ferromagnetic layer of a magnetoresistive layered stripe such as a spin valve film, a tunnel-junction film, and the like. This single domain property is supposed to greatly contribute to reduction in Barkhausen noise. A pair of biasing hard stripe layers or so-called domain control layers are designed to interpose the spin valve film or the tunnel-junction film so as to realize the single domain property in the free ferromagnetic layer. The magnetoresistive layered stripe or film and the biasing hard stripe layers are usually arranged side by side over a flat surface. For example, the flat surface can be defined on the upper surface of a lower electrically-conductive lead layer in the CPP structure electromagnetic transducer element.

When the magnetoresistive layered stripe or film and the biasing hard stripe layers are formed over the lower electrically-conductive lead layer, the magnetoresistive layered stripe or film is forced to contact the lower electrically-conductive lead layer over the entire bottom surface. Specifically, the extent or size of the magnetoresistive layered stripe or film necessarily determines the size of the path for a sensing electric current. If a further reduction in the path for the sensing electric current is intended, the magnetoresistive layered stripe should further be reduced in size. The reduced path for the sensing electric current leads to a still higher sensitivity of the electromagnetic transducer element in reading the magnetic bit data out of a recording medium.

SUMMARY OF THE INVENTION

It is accordingly an object of the present invention to provide a current-perpendicular-to-the-plane structure electromagnetic transducer element greatly contributing to reduction of the path for an electric current supplied to an electromagnetic transducer film without relying on a further reduction in the size of the electromagnetic transducer film.

According to a first aspect of the present invention, there is provided a current-perpendicular-to-the-plane (CPP) structure electromagnetic transducer element comprising: a lower electrically-conductive lead layer; an electrically-conductive terminal piece standing on the surface of the lower electrically-conductive lead layer; an insulation layer spreading over the surface of the lower electrically-conductive lead layer and contacting the side surface of the electrically-conductive terminal piece; an electromagnetic transducer film extending at least across the top surface of the electrically-conductive terminal piece; and an upper electrically-conductive lead layer contacting the upper surface of the electromagnetic transducer film.

The contact established between the electrically-conductive terminal piece and the electromagnetic transducer film is allowed to define the path for the electric current in the CPP electromagnetic transducer element of this type. The electrically-conductive terminal piece is designed to contact the electromagnetic transducer film at the top surface. The contact area of the top surface of the electrically-conductive terminal piece is allowed to determine the size or extent of the path for the electric current through the electromagnetic transducer film. In this manner, the path of the electric current can be reduced in the CPP structure electromagnetic transducer element without relying on reduction in the size of the electromagnetic transducer film.

When the path of the electric current is to be reduced in the CPP structure electromagnetic transducer element, the electromagnetic transducer film may have a second width larger than a first width of the electrically-conductive terminal piece. Reduction in the first width of the electrically-conductive terminal piece serves to reliably establish a reduced path of the electric current between the electromagnetic transducer film and the electrically-conductive terminal piece irrespective of the extent of the second width of the electromagnetic transducer film. The size or extent of the reduced path is allowed to correspond to the extent of the first width.

A flat surface may continuously be defined on the top surface of the electrically-conductive terminal piece and the upper surface of the insulation layer. When the electromagnetic transducer film is formed on the flat surface, it is possible to establish the electromagnetic transducer film at a higher dimensional accuracy. The electromagnetic transducer film may be a magnetoresistive layered stripe or film such as a spin valve film, a tunnel-junction film, and the like.

The lower electrically-conductive lead layer may be made from a magnetic material, for example. Specifically, the lower electrically-conductive lead layer may have not only a property of electric conductors but also a magnetic property. The lower electrically-conductive lead layer of this type is allowed to function as a magnetic shield layer for the electromagnetic transducer film. This greatly contributes to reduction in a so-called read gap in the CPP structure electromagnetic transducer element. The reduction in the read gap leads to a higher linear resolution of the magnetic recordation or data along the recording tracks on a magnetic recording medium.

The upper electrically-conductive lead layer may comprise a terminal bump contacting the electromagnetic transducer film by a third width smaller than the second width. The electrically-conductive terminal bump serves to reduce the contact area between the electromagnetic transducer film and the upper electrically-conductive lead layer. Reduction in the third width of the terminal bump is allowed to establish a reduced path of the electric current between the electromagnetic transducer film and the terminal bump irrespective of the extent of the second width of the electromagnetic transducer film. The size or extent of the reduced path is allowed to correspond to the extent of the third width.

According to a second aspect of the present invention, there is provided a method of making the aforementioned CPP structure electromagnetic transducer element. The method may comprise: forming an electrically-conductive piece on the surface of an electrically-conductive lead layer; forming an insulation layer on the surface of the electrically-conductive lead layer so as to cover the electrically-conductive piece with the insulation layer; subjecting the insulation layer to a flattening treatment so as to expose the top surface of the electrically-conductive piece at a flattened surface defined over the insulation layer; and forming an electromagnetic transducer film on the flattened surface so as to allow extension of the electromagnetic transducer film at least across the top surface of the electrically-conductive piece. In particular, the method allows the formation of the electromagnetic transducer film on the flattened surface, so that the electromagnetic transducer film can be obtained at a higher dimensional accuracy. Here, the electrically-conductive piece turns into the aforementioned electrically-conductive terminal piece.

The method may further comprise: forming the electrically-conductive lead layer according to a predetermined pattern on a surface of a fundamental layer prior to formation of the electrically-conductive piece; forming a basement insulation layer on the surface of the fundamental layer so as to cover the electrically-conductive lead layer with the basement insulation layer; and subjecting the basement insulation layer to a flattening treatment so as to expose the surface of the electrically-conductive lead layer at a flattened surface defined over the basement insulation layer. In particular, the method allows the formation of the electrically-conductive piece on the flattened surface, so that the electrically-conductive piece can be obtained at a higher dimensional accuracy.

Furthermore, the method may further comprise: forming an overlaid insulation layer covering over the electromagnetic transducer film; forming a contact bore penetrating through the overlaid insulation layer so as to expose an upper surface of the electromagnetic transducer film; and filling the contact bore with an electrically-conductive material. The method contributes to a facilitated formation of the aforementioned terminal bump on the upper electrically-conductive lead layer.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
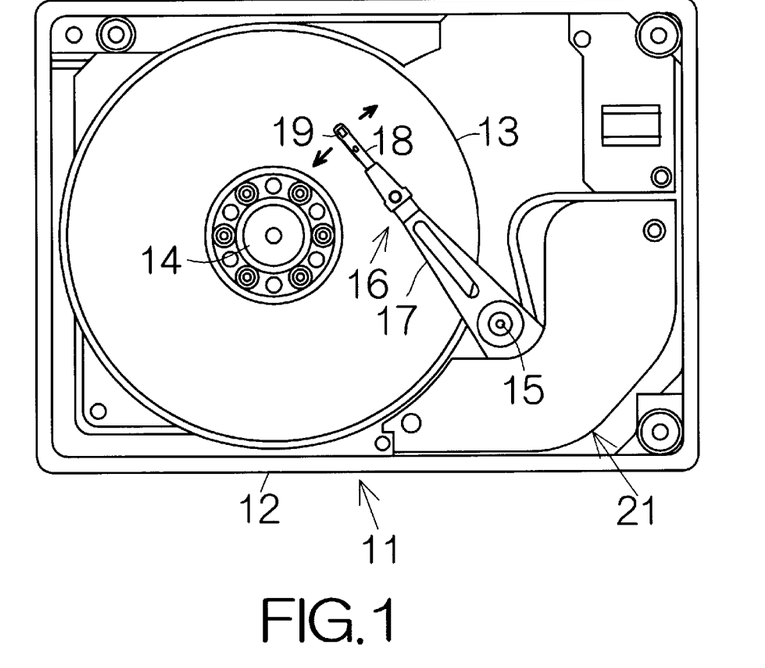
FIG. 1 is a plan view schematically illustrating the structure of a hard disk drive (HDD)

FIG. 1 schematically illustrates the interior structure of a hard disk drive (HDD) 11 as an example of a magnetic recording medium drive or storage device. The HDD 11 includes a box-shaped primary enclosure 12 defining an inner space of a flat parallelepiped, for example. At least one recording medium or magnetic recording disk 13 is accommodated in the inner space within the primary enclosure 12. The magnetic recording disk 13 is mounted on a driving shaft of a spindle motor 14. The spindle motor 14 is allowed to drive the magnetic recording disk 13 for rotation at a higher revolution rate such as 7,200 rpm or 10,000 rpm, for example. A cover, not shown, is coupled to the primary enclosure 12 so as to define the closed inner space between the primary enclosure 12 and itself.

A carriage 16 is also accommodated in the inner space of the primary enclosure 12 for swinging movement about a vertical support shaft 15. The carriage 16 includes a rigid swinging arm 17 extending in the horizontal direction from the vertical support shaft 15, and an elastic head suspension 18 fixed to the tip end of the swinging arm 17 so as to extend forward from the swinging arm 17. As conventionally known, a flying head slider 19 is cantilevered at the head suspension 18 through a gimbal spring, not shown. The head suspension 18 serves to urge the flying head slider 19 toward the surface of the magnetic recording disk 13. When the magnetic recording disk 13 rotates, the flying head slider 19 is allowed to receive an airflow generated along the rotating magnetic recording disk 13. The airflow serves to generate a lift on the flying head slider 19. The flying head slider 19 is thus allowed to keep flying above the surface of the magnetic recording disk 13 during rotation of the magnetic recording disk 13 at a higher stability established by the balance between the lift and the urging force of the head suspension 18.

When the carriage 16 is driven to swing about the support shaft 15 during flight of the flying head slider 19, the flying head slider 19 is allowed to cross the recording tracks defined on the magnetic recording disk 13 in the radial direction of the magnetic recording disk 13. This radial movement serves to position the flying head slider 19 right above a target recording track on the magnetic recording disk 13. In this case, an electromagnetic actuator 21 such as a voice coil motor (VCM) can be employed to realize the swinging movement of the carriage 16, for example. As conventionally known, in the case where two or more magnetic recording disks 13 are incorporated within the inner space of the primary enclosure 12, a pair of the elastic head suspensions 18 are mounted on a single common swinging arm 17 between the adjacent magnetic recording disks 13.

Figure 2:
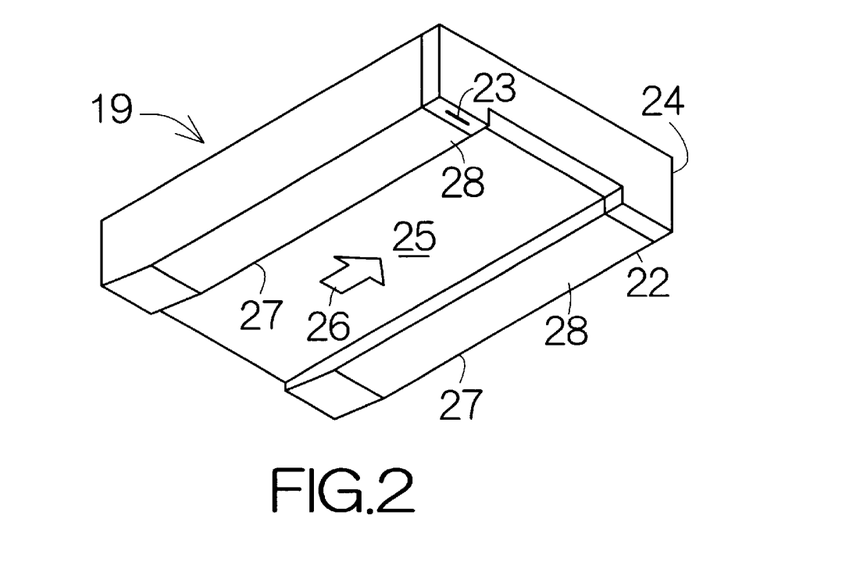
FIG. 2 illustrates an enlarged perspective view of a flying head slider according to a specific example.

FIG. 2 illustrates a specific example of the flying head slider 19. The flying head slider 19 of this type includes a slider body 22 made from $Al_2O_3$—TiC in the form of a flat parallelepiped, and a head protection layer 24 formed to spread over the trailing or downstream end of the slider body 22. The head protection layer 24 may be made of $Al_2O_3$. A read/write electromagnetic transducer 23 is embedded in the head protection layer 24. A medium-opposed surface or bottom surface 25 is defined continuously over the slider body 22 and the head protection layer 24 so as to face the surface of the magnetic recording disk 13 at a distance. The bottom surface 25 is designed to receive an airflow 26 generated along the surface of the rotating magnetic recording disk 13.

A pair of rails 27 are formed to extend over the bottom surface 25 from the leading or upstream end toward the trailing or downstream end. The individual rail 27 is designed to define an air bearing surface (ABS) 28 at its top surface. In particular, the airflow 26 generates the aforementioned lift at the respective air bearing surfaces 28. The read/write electromagnetic transducer 23 embedded in the head protection layer 24 is exposed at the air bearing surface 28 as described later in detail. The flying head slider 19 may take any shape or form other than the above-described one.

Figure 3:
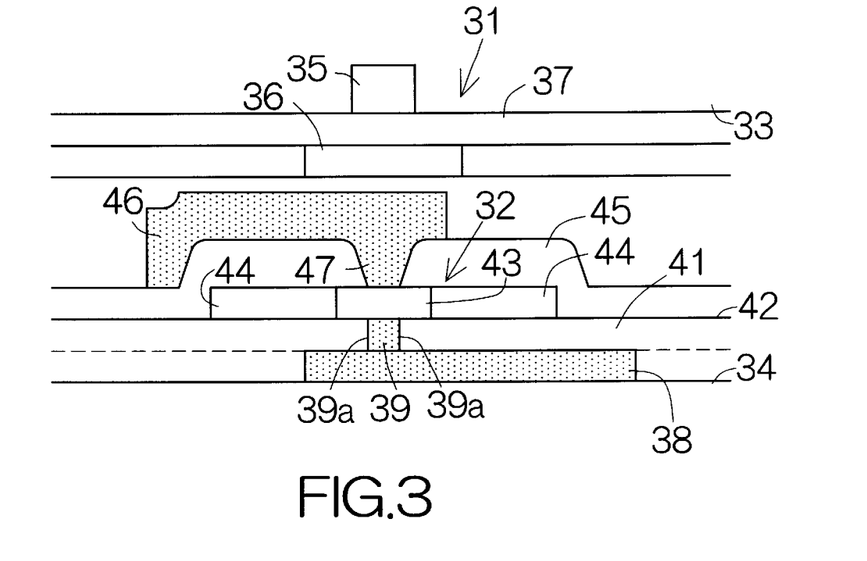
FIG. 3 is an enlarged front view of the flying head slider for illustrating a read/write electromagnetic transducer observed at the bottom surface.

FIG. 3 illustrates an enlarged detailed view of the read/write electromagnetic transducer 23 exposed at the bottom surface 25. The read/write electromagnetic transducer 23 comprises an inductive write element or a thin film magnetic head 31 and a current-perpendicular-to-the-plane (CPP) structure magnetoresistive (MR) read element 32 representative of a CPP structure electromagnetic transducer element. The thin film magnetic head 31 is designed to write a magnetic bit data onto the magnetic recording disk 13 by utilizing a magnetic field induced in a conductive swirly coil pattern, not shown, for example. The CPP structure MR read element 32 is designed to detect a magnetic bit data by utilizing variation in the electric resistance in response to the inversion of the magnetic polarity in a magnetic field acting from the magnetic recording disk 13. The thin film magnetic head 31 and the CPP structure MR read element 32 are interposed between an $Al_2O_3$ (alumina) layer 33 as an upper half layer or overcoat film and an $Al_2O_3$ (alumina) layer 34 as a lower half layer or undercoat film. The overcoat and undercoat films in combination establish the aforementioned head protection layer 24.

The thin film magnetic head 31 includes an upper magnetic pole layer 35 exposing the front end at the air bearing surface 28, and a lower magnetic pole layer 36 likewise exposing the front end at the air bearing surface 28. The upper and lower magnetic pole layers 35, 36 may be made from FeN, NiFe, or the like, for example. The combination of the upper and lower magnetic pole layers 35, 36 establishes the magnetic core of the thin film magnetic head 31.

A non-magnetic gap layer 37 is interposed between the upper and lower magnetic pole layer 35, 36. The non-magnetic gap layer 37 may be made from $Al_2O_3$ (alumina), for example. When a magnetic field is induced at the conductive swirly coil pattern, a magnetic flux is exchanged between the upper and lower magnetic pole layers 35, 36. The non-magnetic gap layer 37 allows the exchanged magnetic flux to leak out of the bottom surface 25. The thus leaked magnetic flux forms a magnetic field for recordation, namely, a write gap magnetic field.

The CPP structure MR read element 32 includes a lower electrically-conductive lead layer 38 spreading over the upper surface of the alumina layer 34 as a basement insulation layer. The lower electrically-conductive lead layer 38 may have not only a property of electric conductors but also a soft magnetic property. If the lower electrically-conductive lead layer 38 is made of a soft magnetic electric conductor, such as NiFe, for example, the lower electrically-conductive lead layer 38 is also allowed to serve as a lower shield layer for the CPP structure MR read element 32.

An electrically-conductive terminal piece 39 is located on the upper surface of the lower electrically-conductive lead layer 38. The electrically-conductive terminal piece 39 is designed to stand on the upper surface of the lower electrically-conductive lead layer 38. A side surface 39a upright to the upper surface of the lower electrically-conductive lead layer 38 can be defined on the electrically-conductive terminal piece 39. The electrically-conductive terminal piece 39 may have not only a property of electric conductors but also a soft magnetic property. If the electrically-conductive terminal piece 39 is made of a soft magnetic electric conductor, such as NiFe, for example, the electrically-conductive terminal piece 39 is also allowed to serve as a lower shield layer for the CPP structure MR read element 32.

The lower electrically-conductive lead layer 38 is embedded in an insulation layer 41 spreading over the surface of the alumina layer 34. The insulation layer 41 is designed to extend over the surface of the lower electrically-conductive lead layer 38 so as to contact the side surface 39a of the electrically-conductive terminal piece 39. Here, a flat surface 42 can be defined continuously over the top surface of the electrically-conductive terminal piece 39 and the upper surface of the insulation layer 41.

An electromagnetic transducer film or magnetoresistive (MR) layered stripe 43 is located on the flat surface 42 so as to extend along the air bearing surface 28. The MR layered stripe 43 is designed to extend at least across the top surface of the electrically-conductive terminal piece 39. In this manner, only the electrically-conductive terminal piece 39 is allowed to establish an electric connection between the MR layered stripe 43 and the lower electrically-conductive lead layer 38. The structure of the MR layered stripe 43 will be described later in detail.

Likewise, a pair of biasing hard magnetic stripe layers, namely, domain control stripe layers 44, are located on the flat surface 42 so as to extend along the air bearing surface 28. The domain control stripe layers 44 are designed to interpose the MR layered stripe 43 along the air bearing surface 28 over the flat surface 42. The domain control stripe layers 44 may be made from a metallic material such as CoPt, CoCrPt, or the like. A specific magnetization is established in the domain control stripe layers 44 along a predetermined lateral direction across the MR layered stripe 43. The magnetization in the domain control stripe layers 44 in this manner serves to form a biasing magnetic field between the domain control stripe layers 44. The biasing magnetic field is designed to realize the single domain property in a free ferromagnetic layer, for example, in the MR layered stripe 43.

The flat surface 42 is covered with an overlaid insulation layer 45. The overlaid insulation layer 45 is designed to hold the MR layered stripe 43 and the domain control stripe layers 44 against the insulation layer 41. An upper electrically-conductive lead layer 46 is allowed to spread over the upper surface of the overlaid insulation layer 45. In the same manner as the lower electrically-conductive lead layer 38, the upper electrically-conductive lead layer 46 may have not only a property of electric conductors but also a soft magnetic property. If the upper electrically-conductive lead layer 46 is made of a soft magnetic electric conductor, such as NiFe, for example, the upper electrically-conductive lead layer 46 is also allowed to serve as an upper shield layer for the CPP structure MR read element 32. The space defined between the aforementioned lower shield layer or the lower electrically-conductive lead layer 38 and the upper electrically-conductive lead layer 46 determines the linear resolution of the magnetic recordation or data along the recording tracks on the magnetic recording disk 13. The upper electrically-conductive lead layer 46 comprises a terminal bump 47 penetrating through the overlaid insulation layer 45 so as to contact the upper surface of the MR layered stripe 43. In this manner, only the terminal bump 47 is allowed to establish an electric connection between the MR layered stripe 43 and the upper electrically-conductive lead layer 46.

Figure 4:
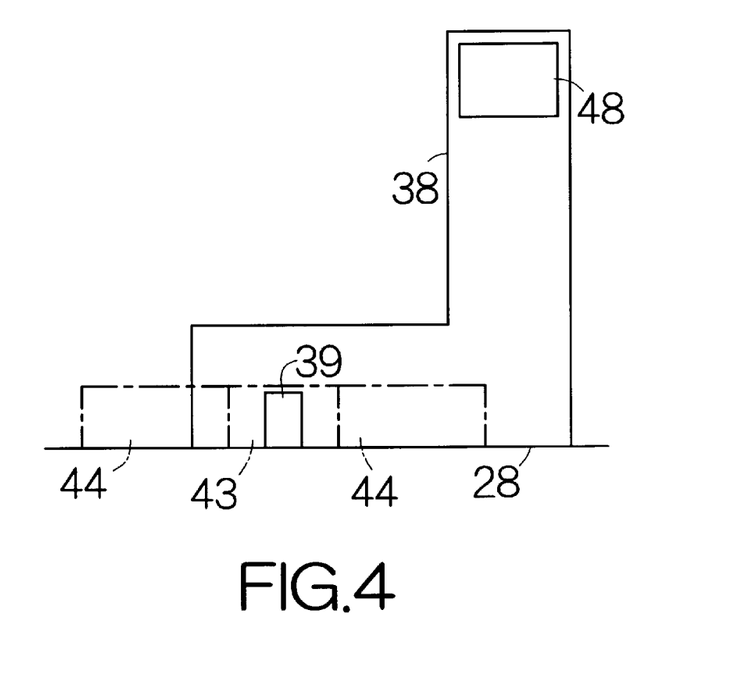
FIG. 4 is a plan view illustrating a lower electrically-conductive lead layer of a current-perpendicular-to-the-plane (CPP) structure magnetoresistive (MR) read element.

As is apparent from FIG. 4, the lower electrically-conductive lead layer 38 is allowed to extend rearward over the surface of the alumina layer 34 from the front end exposed at the air bearing surface 28. A terminal pad 48 is coupled to the rear end of the lower electrically-conductive lead layer 38. The terminal pad 48 may extend over the upper surface of the lower electrically-conductive lead layer 38. The terminal pad 48 is typically connected to electrically-conductive terminal pads, not shown, on the elastic head suspension 18 via Au balls, not shown, for example, when the flying head slider 19 fixed to the head suspension 18.

Figure 5:
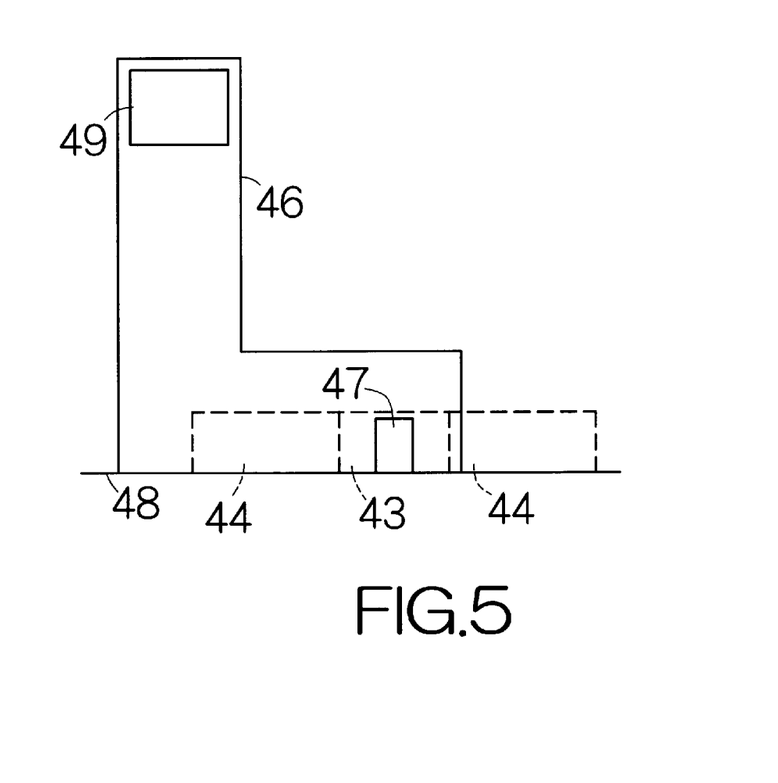
FIG. 5 is a plan view illustrating an upper electrically-conductive lead layer of the CPP structure MR read element.

As is apparent from FIG. 5, the upper electrically-conductive lead layer 46 is allowed to extend rearward over the surface of the overlaid insulation layer 45 from the front end exposed at the air bearing surface 28. A terminal pad 49 is coupled to the rear end of the upper electrically-conductive lead layer 46. The terminal pad 49 may extend over the upper surface of the upper electrically-conductive lead layer 46. The terminal pad 49 is typically connected to electrically-conductive terminal pads, not shown, on the elastic head suspension 18 via Au balls, not shown, for example, when the flying head slider 19 fixed to the head suspension 18.

Figure 6:
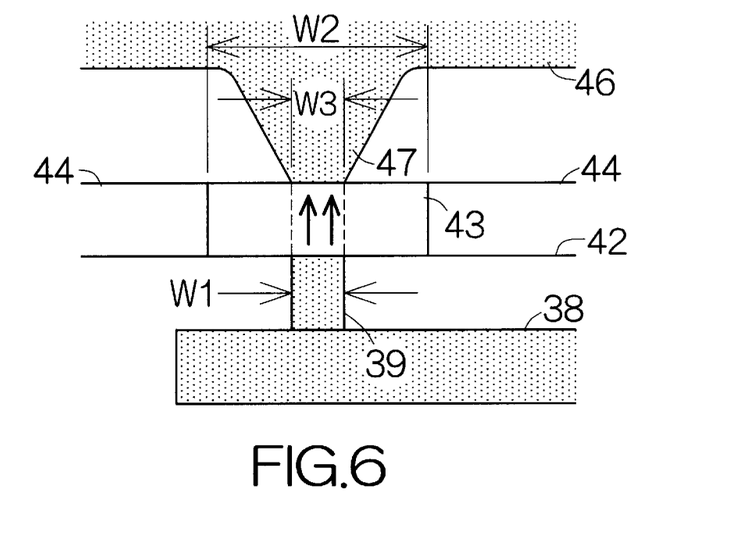
FIG. 6 is an enlarged partial front view of the CPP structure MR read element for schematically illustrating the path for the sensing electric current through a magnetoresistive (MR) layered stripe or film.

As shown in FIG. 6, the width W1 of the electrically-conductive terminal piece 39 is set extremely smaller than the width W2 of the MR layered stripe 43. The width W3 of the terminal bump 47 is also set extremely smaller than the width W2 of the MR layered stripe 43. The individual width W1, W2, W3 may be measured in parallel with the flat surface 42 along the air bearing surface 28. The width W2 of the MR layered stripe 43 determines the lateral resolution of the magnetic recordation along the radial direction of the magnetic recording disk 13. The width W3 of the terminal bump 47 may be set equal to the width W1 of the electrically-conductive terminal piece 39.

A sensing electric current can be supplied to the MR layered stripe 43 through the upper and lower electrically-conductive lead layers 46, 38 in the CPP structure MR read element 32. As is apparent from FIG. 6, the electrically-conductive terminal piece 39 as well as the terminal bump 47 serves to reduce the path for the supplied sensing electric current in the MR layered stripe 43. Moreover, the CPP structure MR read element 32 of this type is allowed to establish the path of the sensing electric current at the central area of the MR layered stripe 43 remote from the contact to the domain control stripe layers 44.

Figure 7:
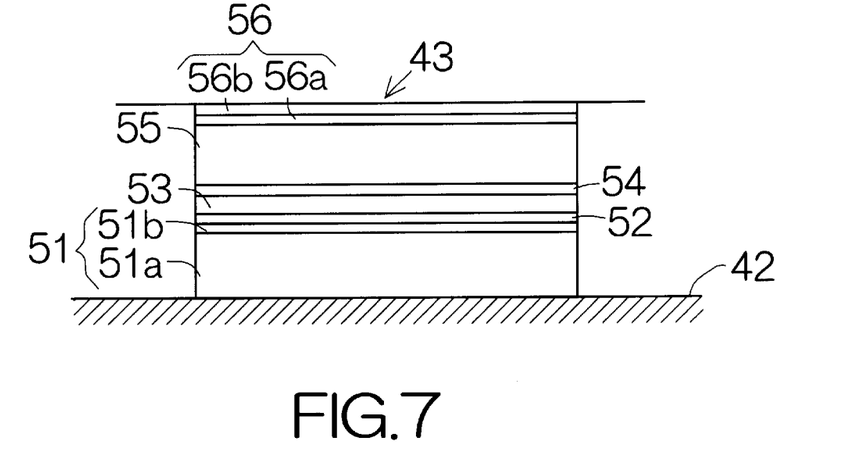
FIG. 7 is an enlarged front view schematically illustrating a spin valve film according to a specific example of the MR layered stripe.

FIG. 7 illustrates a specific example of the MR layered stripe 43. The MR layered stripe 43 is a so-called spin valve film. Specifically, the MR layered stripe 43 includes a basement layer 51, a free ferromagnetic layer 52, a non-magnetic intermediate or spacer layer 53, a pinned ferromagnetic layer 54, a pinning antiferromagnetic layer 55 and a protection layer 56 superposed one another in this sequence. A strong exchange coupling can thus be established between the antiferromagnetic layer 55 and the pinned ferromagnetic layer 54. The antiferromagnetic layer 55 serves to pin or fix the magnetization of the pinned ferromagnetic layer 54 in a specific direction. Here, the basement layer 51 may comprise a Ta layer 51a and an NiFe layer 51b overlaid on the surface of the Ta layer 51a. The free and pinned ferromagnetic layers 52, 54 may be made from a ferromagnetic material such as $Co_{90}Fe_{10}$ or the like. The non-magnetic spacer layer 53 may be made from a metallic material such as Cu, for example. The antiferromagnetic layer 55 may be made from an antiferromagnetic alloy material such as FeMn, PdPtMn, or the like, for example. The protection layer 56 may comprise a Cu layer 56a and a cap Ta layer 56b overlaid on the surface of the Cu layer 56a.

When the CPP structure MR read element 32 is opposed to the surface of the magnetic recording disk 13 for reading a magnetic information data, the magnetization of the free ferromagnetic layer 52 is allowed to rotate in the MR layered stripe 43 or spin valve film in response to the inversion of the magnetic polarity applied from the magnetic recording disk 13. The rotation of the magnetization in the free ferromagnetic layer 52 induces variation in the electric resistance of the MR layered stripe 43, namely, the spin valve film. When a sensing electric current is supplied to the MR layered stripe 43 through the upper and lower electrically-conductive lead layers 46, 38, a variation in the level of any parameter such as voltage appears, in response to the variation in the magnetoresistance, in the sensing electric current output from the terminal pads 48, 49. The variation in the level can be utilized to detect a magnetic bit data recorded on the magnetic recording disk 13. In this situation, the path of the sensing electric current can be reduced in the MR layered stripe 43 or the spin valve film, so that the MR layered stripe 43 is allowed to exhibit a higher sensitivity to the magnetic field applied from the magnetic recording disk 13.

Figure 8:
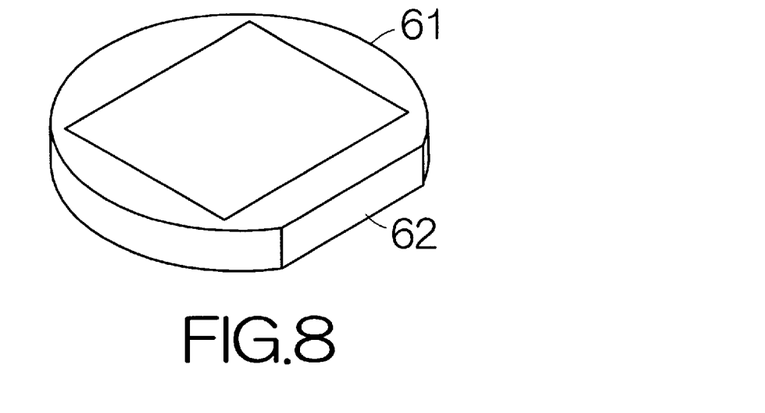
FIG. 8 is a perspective view illustrating a wafer.

Next, a brief description will be made on a method of producing the flying head slider 19. First of all, a wafer 61 made of $Al_2O_3$—TiC is prepared, as shown in FIG. 8. The $Al_2O_3$ (alumina) lamination 34 is formed over the surface of the wafer 61. A flat surface 62 is defined on the peripheral surface of the wafer 61. The flat surface 62 serves to identify the direction of the wafer 61.

Figure 9:
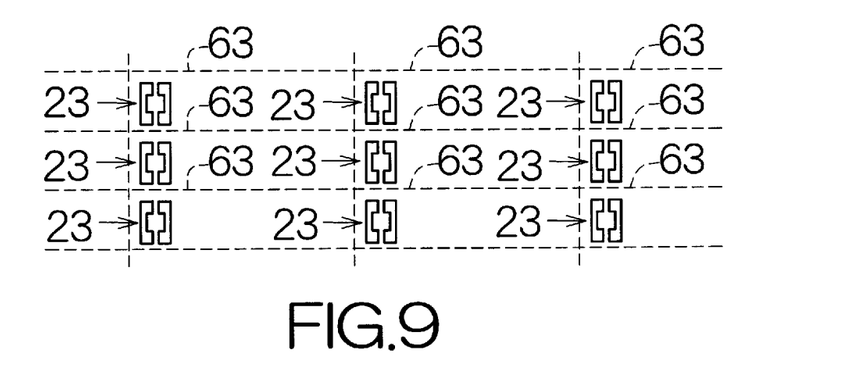
FIG. 9 is an enlarged partial plan view of the wafer for illustrating a plurality of read/write electromagnetic transducers.

The read/write electromagnetic transducers 23 are established over the surface of the wafer 61. The read/write electromagnetic transducers 23 are formed on blocks 63, respectively, which will be cut out into the individual flying head sliders 19, as shown in FIG. 9. For example, 10,000 read/write electromagnetic transducers 23 in total can be obtained in a hundred rows by a hundred columns on the wafer 61 of 5 inches diameter. A method of making the individual read/write electromagnetic transducer 23 will be described later in detail. The alumina layer 33 is then formed to cover over the read/write electromagnetic transducers 23 on the wafer 61. In this manner, the read/write electromagnetic transducers 23 can be embedded in the head protection layer 24 made from alumina on the wafer 61.

Figure 10:
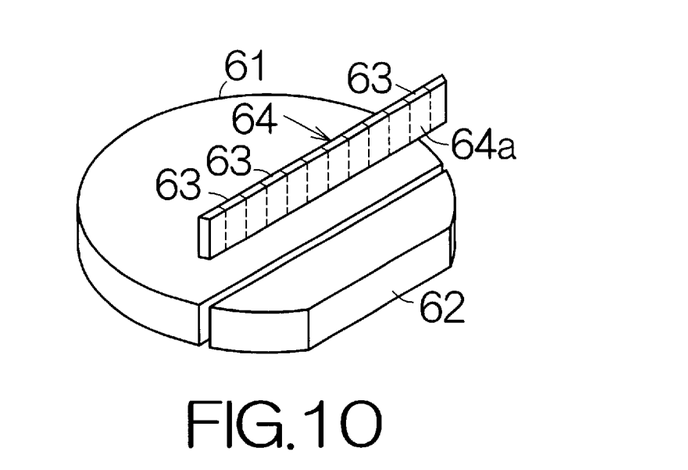
FIG. 10 is a perspective view illustrating a wafer bar cut out from the wafer.

After the read/write electromagnetic transducers 23 have been established in the above-described manner, wafer bars 64 are cut out of the wafer 61, as shown in FIG. 10. Each of the wafer bars 64 includes a row of the blocks 63. An incision in parallel with the flat surface 62 is employed to cut off the wafer bar 64, for example. An exposed surface 64a can thus be defined on the wafer bar 64 in parallel with the flat surface 62. The bottom surface 25 of the flying head slider 19 can be formed or shaped over the exposed surface 64a for the respective blocks 63. Finally, each of the blocks 63 is cut out of the wafer bar 64 so as to turn into the individual flying head slider 19.

Figure 11:
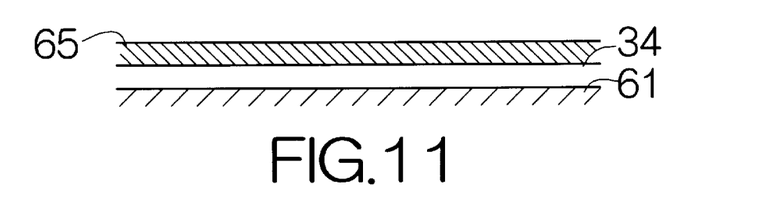
FIG. 11 is an enlarged partial sectional view of the wafer for illustrating the process of forming the lower electrically-conductive lead layer on the exposed surface of a fundamental layer.

Here, a detailed description will be made on a method of making the read/write electromagnetic transducer 23. As shown in FIG. 11, an electrically-conductive magnetic layer 65 is formed over the upper surface of the alumina layer 34 on the wafer 61. The alumina layer 34 in this case serves as a fundamental layer. Sputtering may be employed to form the electrically-conductive magnetic layer 65. The electrically-conductive magnetic layer 65 may be made from a soft magnetic material such as NiFe, for example. The electrically-conductive magnetic layer 65 is allowed to uniformly spread over the surface of the wafer 61.

Figure 12:
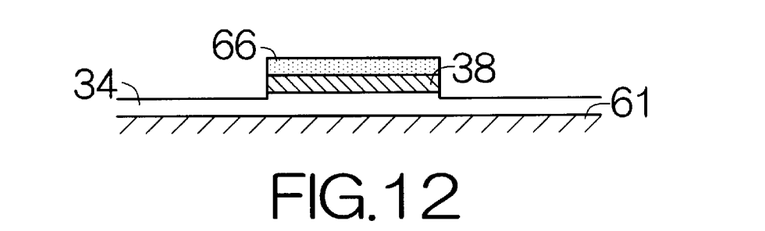
FIG. 12 is an enlarged partial sectional view of the wafer for illustrating the process of forming the lower electrically-conductive lead layer on the exposed surface of the fundamental layer.

The lower electrically-conductive lead layers 38 are then formed on the wafer 61 for the respective blocks 63. A predetermine pattern is employed to shape or scrape the lower electrically-conductive lead layers 38 out of the electrically-conductive magnetic layer 65 on the surface of the alumina layer 34. As shown in FIG. 12, a photoresist film 66 may be employed to define the pattern. When the electrically-conductive magnetic layer 65 is subjected to etching around the photoresist film 66, the electrically-conductive magnetic layers 65 reflecting the pattern are allowed to remain below the photoresist film 66. The lower electrically-conductive layers 38 are thus formed in this manner. The photoresist film 66 is removed after the etching.

Figure 13:
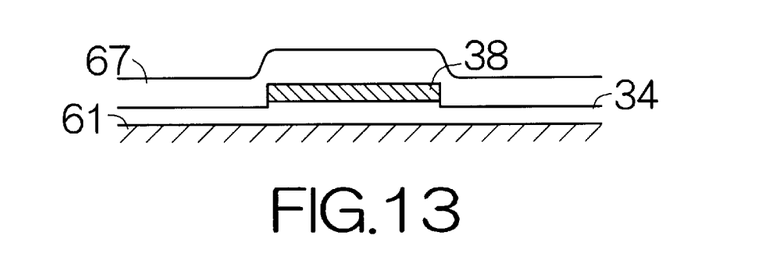
FIG. 13 is an enlarged partial sectional view of the wafer for illustrating the process of forming a basement insulation layer on the fundamental layer.

As shown in FIG. 13, a basement insulation layer 67 is then formed over the upper surface of the alumina layer 34. The basement insulation layer 67 may be made from an insulator material such as $Al_2O_3$, $SiO_2$, and the like. The basement insulation layer 67 is allowed to uniformly spread over the surface of the wafer 61, so that the lower electrically-conductive lead layers 38 can be covered with the basement insulation layer 67 on the alumina layer 34.

Figure 14:
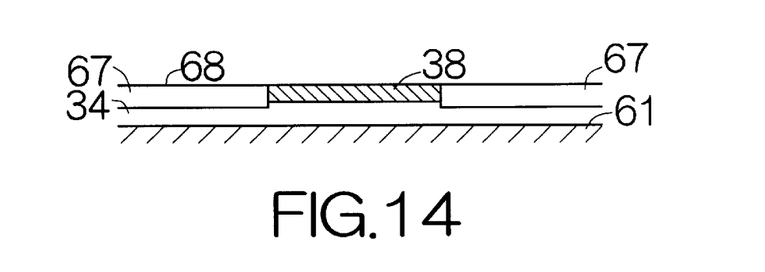
FIG. 14 is an enlarged partial sectional view of the wafer for illustrating the process of exposing the surface of the lower electrically-conductive lead layer.

Thereafter, the basement insulation layer 67 is subjected to a flattening treatment. A CMP (chemical mechanical polishing) method may be employed in the flattening treatment, for example. Alternatively, an Argon gas cluster treatment may be employed in place of the CMP method. Otherwise, the combination of the CMP method and the Argon gas cluster treatment may be employed to flatten the surface of the basement insulation layer 67. As shown in FIG. 14, the flattening treatment is continued until the lower electrically-conductive layers 38 are exposed. In this manner, a flattened surface 68 can be defined continuously over the upper surfaces of the lower electrically-conductive lead layers 38 and the upper surface of the basement insulation layer 67.

Figure 15:
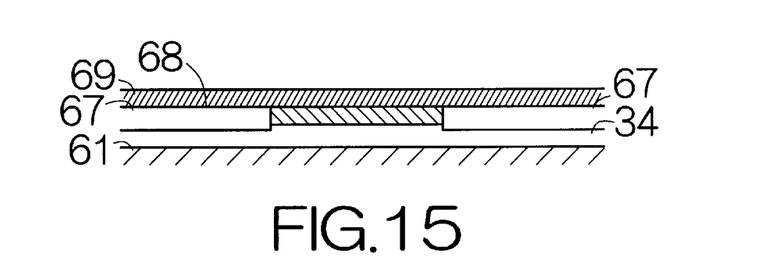
FIG. 15 is an enlarged partial sectional view of the wafer for illustrating the process of forming an electrically-conductive piece on the surface of the lower electrically-conductive lead layer.

The electrically-conductive pieces 39 are thereafter formed on the flattened surface 68. As shown in FIG. 15, a magnetic layer 69 is formed to spread over the wafer 61, for example. Sputtering may be employed to form the magnetic layer 69. The magnetic layer 69 may be made from a soft magnetic material such as NiFe, for example. The magnetic layer 69 is allowed to uniformly spread over the surface of the wafer 61.

Figure 16:
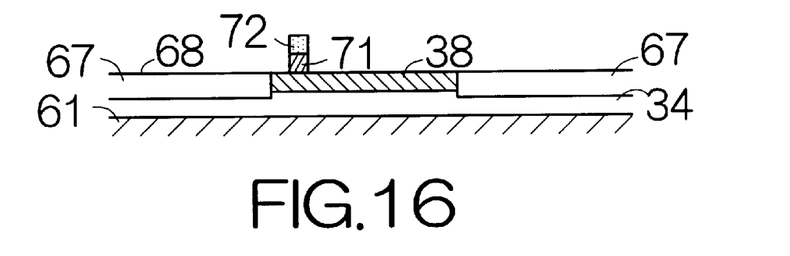
FIG. 16 is an enlarged partial sectional view of the wafer for illustrating the process of forming the electrically-conductive piece on the surface of the lower electrically-conductive lead layer.

Electrically-conductive pieces 71 are then formed on the wafer 61 for the respective blocks 63. A predetermined pattern is employed to shape or scrape the electrically-conductive pieces 71 out of the magnetic layer 69 on the surface of the lower electrically-conductive lead layers 38. As shown in FIG. 16, a photoresist film 72 may be employed to define the pattern. When the magnetic layer 69 is subjected to etching around the photoresist film 72, the electrically-conductive pieces 71 reflecting the pattern are allowed to remain below the photoresist film 72. The electrically-conductive pieces 71 are thus formed in this manner. The photoresist film 72 is removed after the etching.

Figure 17:
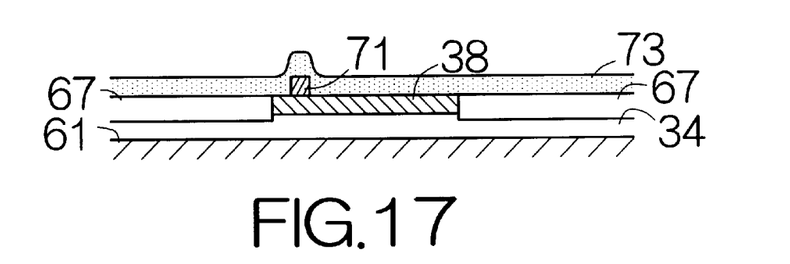
FIG. 17 is an enlarged partial sectional view of the wafer for illustrating the process of forming an insulation layer on the flattened surface.

As shown in FIG. 17, an intermediate insulation layer 73 is formed to extend over the exposed surfaces of the lower electrically-conductive lead layers 38 and the basement insulation layer 67 on the wafer 61. The intermediate insulation layer 73 may be made from an insulator material such as $Al_2O_3$, $SiO_2$, and the like. The intermediate insulation layer 73 is allowed to uniformly spread over the surface of the wafer 61, so that the electrically-conductive pieces 71 can be covered with the intermediate insulation layer 73 on the lower electrically-conductive lead layers 38.

Figure 18:
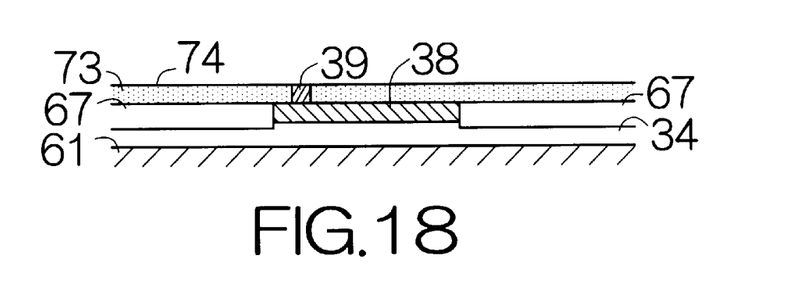
FIG. 18 is an enlarged partial sectional view of the wafer for illustrating the process of exposing the top surface of the electrically-conductive piece.

Thereafter, the intermediate insulation layer 73 is subjected to a flattening treatment. A CMP (chemical mechanical polishing) method may be employed in the flattening treatment, for example. Alternatively, an Argon gas cluster treatment may be employed in place of the CMP method. Otherwise, the combination of the CMP method and the Argon gas cluster treatment may be employed to flatten the surface of the intermediate insulation layer 73. As shown in FIG. 18, the flattening treatment is continued until the electrically-conductive pieces 71 are exposed. In this manner, a flattened surface 74 can be defined continuously over the top surfaces of the electrically-conductive pieces 71 and the upper surface of the intermediate insulation layer 73. The electrically-conductive terminal pieces 39 are thus formed in the above-described manner.

Figure 19:
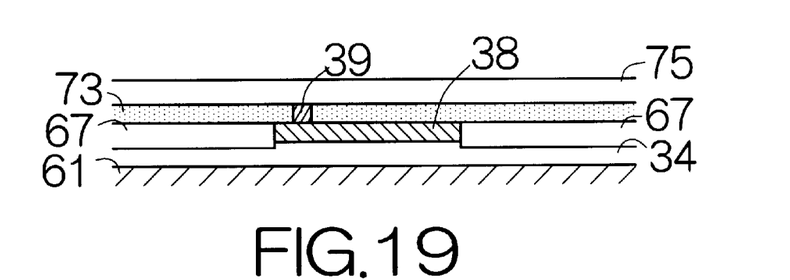
FIG. 19 is an enlarged partial sectional view of the wafer for illustrating the process of forming a layered material having composite layers identical to that of the spin valve film.

The MR layered stripes 43 and pairs of the domain control stripe layers 44 are thereafter formed on the flattened surface 74 for the respective blocks 63. As shown in FIG. 19, a layered material 75 is first formed to spread over the wafer 61, for example. The layered material 75 is designed to have the composite layers identical to that of the MR layered stripe 43. Sputtering may be employed to form the layered material 75. The layered material 75 is allowed to uniformly spread over the surface of the wafer 61. Establishment of the flattened surface 74 greatly contributes to formation of the respective composite layers in the layered material 75 at a higher dimensional accuracy.

Figure 20:
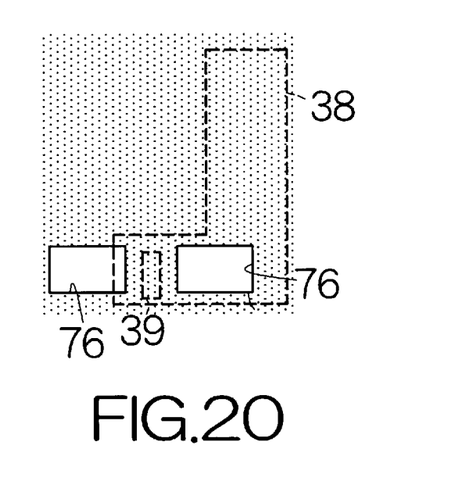
FIG. 20 is an enlarged partial plan view of the wafer for illustrating a void defined in the layered material.
Figure 21:
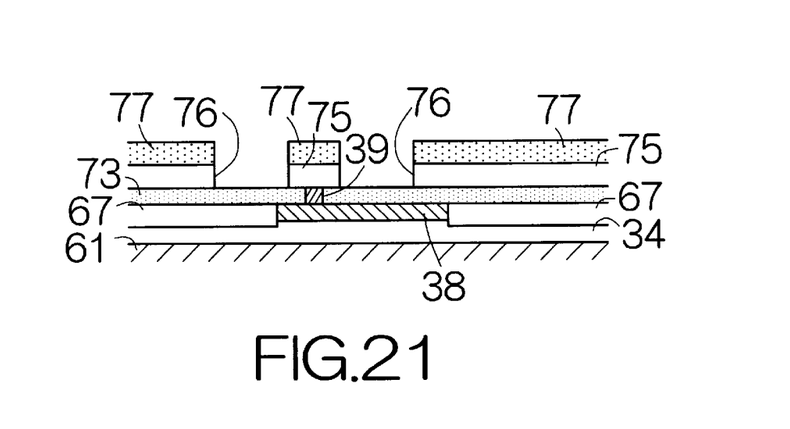
FIG. 21 is an enlarged partial sectional view of the wafer for illustrating the process of forming the void in the layered material.

The domain control stripe layers 44 are thereafter formed on the wafer 61. As shown in FIG. 20, voids 76 are formed in the layered material 75 for the respective blocks 63. The individual void 76 is designed to define the shape of the domain control stripe layer 44. A photoresist film 77 is formed over the upper surface of the layered material 75 so as to pattern the voids 76, as shown in FIG. 21. After the formation of the photoresist film 77, the layered material 75 is subjected to etching. The voids 76 are thus defined in the layered material 75. The surface of the intermediate insulation layer 73 is exposed at the bottom of the voids 76.

Figure 22:
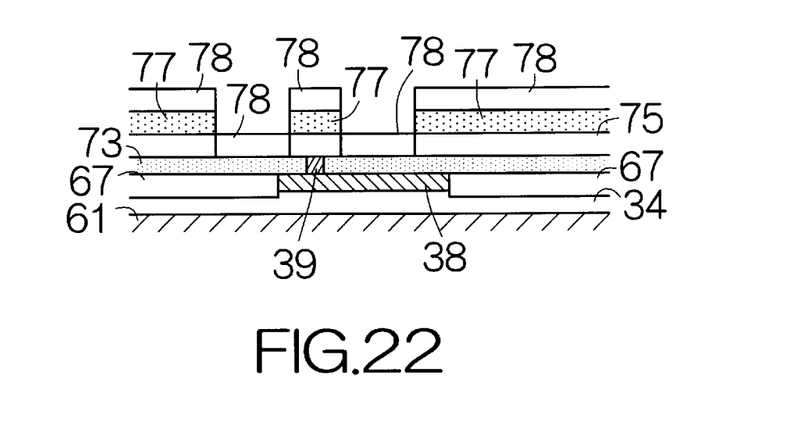
FIG. 22 is an enlarged partial sectional view of the wafer for illustrating the process of filling the void with a magnetic material.

As shown in FIG. 22, a magnetic layer 78 is then formed to spread over the wafer 61. The voids 76 are filled with the magnetic layer 78. The domain control stripe layer 44 is thus established in the individual void 76 on the exposed surface of the intermediate insulation layer 73. When the photoresist film 77 is removed after the formation of the magnetic layer 78, the magnetic layer 78 on the layered material 75 can be removed from the wafer 61. The upper surface of the layered material 75 is allowed to get exposed again.

Figure 23:
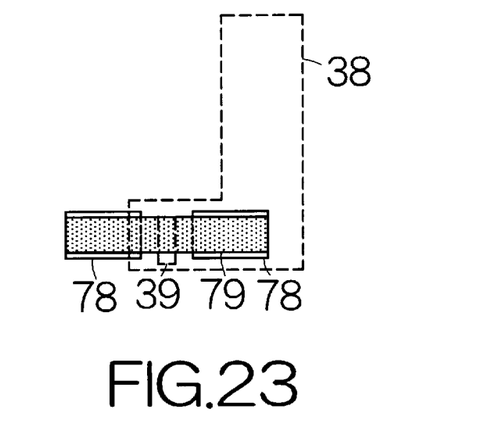
FIG. 23 is an enlarged partial plan view of the wafer for illustrating a photoresist film defining the MR layered stripe and a pair of biasing hard stripe layers.

When the domain control stripe layers 44 have been formed in the above-described manner, the MR layered stripes 43 are shaped or scraped out of the layered material 75 for the respective blocks 63. Etching may be employed to shape or scrape the MR layered stripes 43, for example. As shown in FIG. 23, a stripe of photoresist film 79 is formed on the remaining layered material 75 and domain control stripe layers 44 so as to linearly extend in a specific direction on the individual block 63. When the layered material 75 and the domain control stripe layers 44 are partly removed around the photoresist film 79, an integrated structure comprising the MR layered stripe 43 and the domain control stripe layers 44 can be obtained on the flattened surface 74. The formed MR layered stripe 43 is allowed to extend at least across the top surface of the electrically-conductive terminal piece 39. Since the MR layered stripes 43 and the domain control stripe layers 44 are formed on the flattened surface 74 in the above-described manner, the MR layered stripes 43 and the domain control stripe layers 44 can be obtained at a higher dimensional accuracy. The photoresist film 79 is removed after the complete establishment of the integrated structure.

Figure 24:
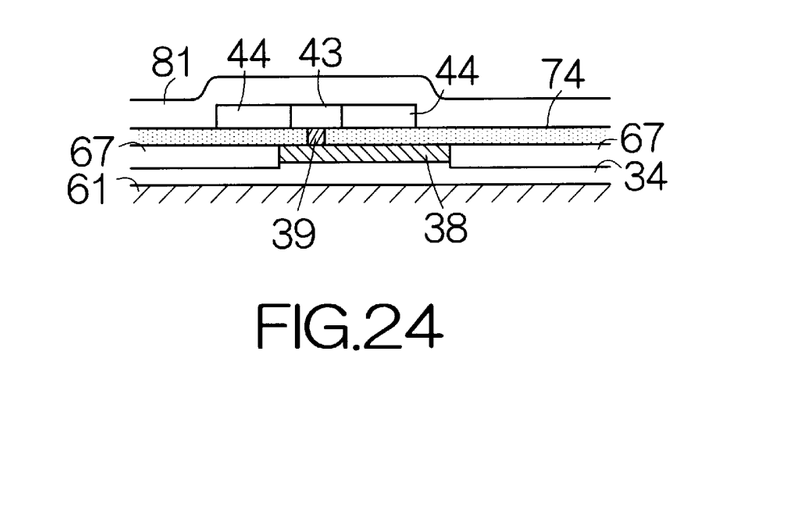
FIG. 24 is an enlarged partial sectional view of the wafer for illustrating the process of forming an overlaid insulation layer covering over the MR layered stripe and the biasing hard stripe layers.

As shown in FIG. 24, an overlaid insulation layer 81 is thereafter formed to spread over the flattened surface 74 which has gotten exposed again over the wafer 61. The overlaid insulation layer 81 may be made from an insulator material such as $Al_2O_3$, $SiO_2$, and the like. The overlaid insulation layer 81 is allowed to uniformly spread over the surface of the wafer 61, so that the integrated structures each comprising the MR layered stripe 43 and the domain control stripe layers 44 can be covered with the overlaid insulation layer 81 on the flattened surface 74.

Figure 25:
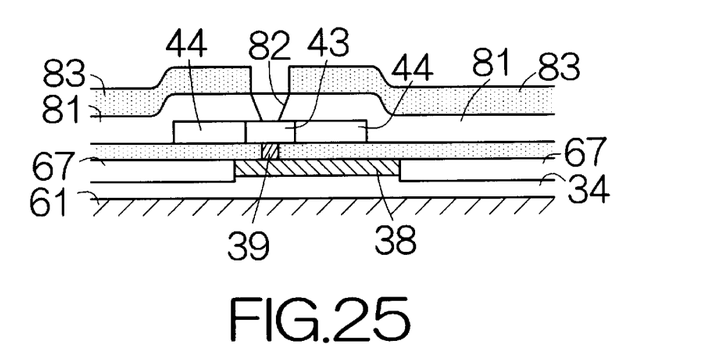
FIG. 25 is an enlarged partial sectional view of the wafer for illustrating the process of forming a contact bore in the overlaid insulation layer.

As shown in FIG. 25, a contact bores 82 are formed in the overlaid insulation layer 81 for the respective blocks 63 on the wafer 61. The individual contact bore 82 is designed to reach the upper surface of the MR layered stripe 43. A photoresist film 83 is formed on the exposed surface of the overlaid insulation layer 81 so as to define the contours of the contact bores 82. When the overlaid insulation layer 81 is subjected to etching off the photoresist film 83, the contact bores 82 can be obtained to penetrate through the overlaid insulation layer 81. The contact bore 82 serves to expose the upper surface of the MR layered stripe 43. The photoresist film 83 is removed after the formation of the contact bores 82.

Figure 26:
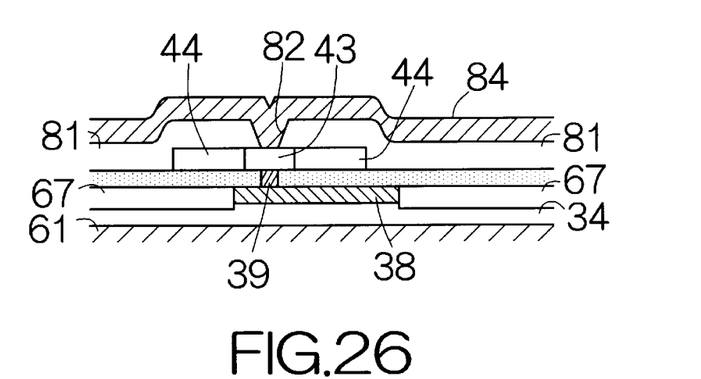
FIG. 26 is an enlarged partial sectional view of the wafer for illustrating the process of forming the upper electrically-conductive lead layer.

After the contact bores 82 have been defined in the overlaid insulation layer 81, the upper electrically-conductive lead layers 46 are formed to extend over the surface of the overlaid insulation layer 81. As shown in FIG. 26, an electrically-conductive magnetic layer 84 is first formed to spread over the surface of the wafer 61, for example. Sputtering may be employed to form the electrically-conductive magnetic layer 84. The electrically-conductive magnetic layer 84 may be made from a soft magnetic material such as NiFe, for example. The magnetic layer 84 is allowed to uniformly spread over the surface of the wafer 61, so that the contact bores 82 can completely be filled with the electrically-conductive magnetic layer 84.

The upper electrically-conductive lead layers 46 are then established on the wafer 61 for the respective blocks 63. A predetermine pattern is employed to shape or scrape the upper electrically-conductive lead layers 46 out of the electrically-conductive magnetic layer 84 on the surface of the overlaid insulation layer 81. A photoresist film, not shown, may be employed to define the pattern. When the electrically-conductive magnetic layer 84 is subjected to etching around the photoresist film, the electrically-conductive magnetic layers 84 reflecting the pattern are allowed to remain below the photoresist film. The upper electrically-conductive layers 46 are thus formed in this manner. The photoresist film is removed after the etching.

As conventionally known, the thin film magnetic heads 31 are then formed over the CPP structure MR read elements 32 on the wafer 61. Prior to the formation of the thin film magnetic heads 31, a non-magnetic insulation layer, not shown, may be formed to cover over the CPP structure MR read elements 32. The lower magnetic pole layer 36, the non-magnetic gap layer 37, an insulation layer containing the coil pattern, and the upper magnetic pole layer 35 are formed in this sequence on the exposed surface of the non-magnetic insulation layer. The exposed surface of the non-magnetic insulation layer may be subjected to a flattening treatment prior to the construction of the thin film magnetic head 31. When the thin film magnetic heads 31 have finally been embedded within the alumina layer 33, the establishment of the read/write electromagnetic transducer 23 is completed.

Figure 27:
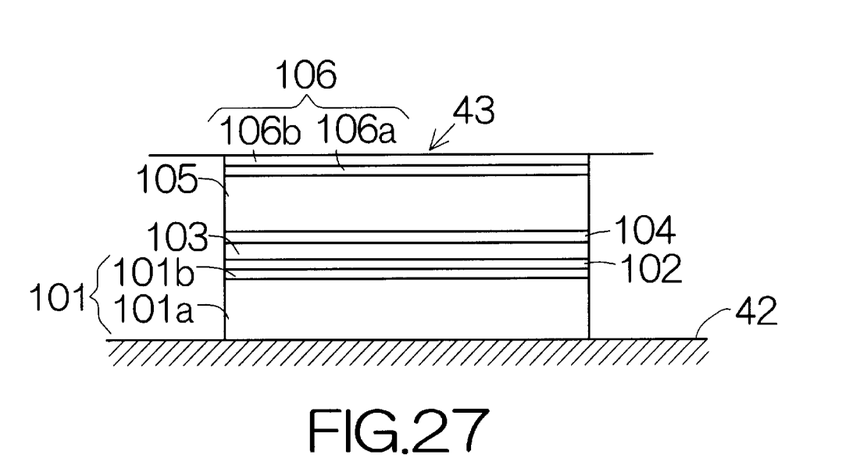
FIG. 27 is an enlarged front view schematically illustrating a tunnel-junction film according to another specific example of the MR layered stripe.

FIG. 27 illustrates another specific example of the MR layered stripe 43. The MR layered stripe 43 is a so-called tunnel-junction film. Specifically, the MR layered stripe 43 includes a basement layer 101, a free ferromagnetic layer 102, an insulation layer 103, a pinned ferromagnetic layer 104, a pinning antiferromagnetic layer 105 and a protection layer 106 superposed one another in this sequence. A strong exchange coupling can thus be established between the antiferromagnetic layer 105 and the pinned ferromagnetic layer 104. The antiferromagnetic layer 105 serves to pin or fix the magnetization of the pinned ferromagnetic layer 104 in a specific direction. Here, the basement layer 101 may comprise a Ta layer 110a and an NiFe layer 101b overlaid on the surface of the Ta layer 110a. The free and pinned ferromagnetic layers 102, 104 may be made from a ferromagnetic material such as $Co_{90}Fe_{10}$ or the like. The insulation layer 103 may be made from a metal oxide including $Al_2O_3$ (alumina) or the like, for example. The antiferromagnetic layer 105 may be made from an antiferromagnetic alloy material such as FeMn, PdPtMn, or the like, for example. The protection layer 106 may comprise a Cu layer 106a and a cap Ta layer 106b overlaid on the surface of the Cu layer 106a.

When the CPP structure MR read element 32 of this type is opposed to the surface of the magnetic recording disk 13 for reading a magnetic information data, the magnetization of the free ferromagnetic layer 102 is allowed to rotate in the MR layered stripe 43 or tunnel-junction film in response to the inversion of the magnetic polarity applied from the magnetic recording disk 13. The rotation of the magnetization in the free ferromagnetic layer 102 induces variation in the electric resistance of the MR layered stripe 43, namely, the tunnel-junction film. When a sensing electric current is supplied to the MR layered stripe 43 through the upper and lower electrically-conductive lead layers 46, 38, a variation in the level of any parameter such as voltage appears, in response to the variation in the magnetoresistance, in the sensing electric current output from the terminal pads 48, 49. The variation in the level can be utilized to detect a magnetic bit data recorded on the magnetic recording disk 13. In this situation, the path of the sensing electric current can be reduced in the MR layered stripe 43 or the tunnel-junction film, so that the MR layered stripe 43 is allowed to exhibit a higher sensitivity to the magnetic field applied from the magnetic recording disk 13.

What is claimed is:

1. A current-perpendicular-to-the-plane structure electromagnetic transducer element comprising:

a lower electrically-conductive lead layer;

an electrically-conductive terminal piece standing on a surface of the lower electrically-conductive lead layer;

an insulation layer spreading over said surface of the lower electrically-conductive lead layer and contacting a side surface of the electrically-conductive terminal piece;

an electromagnetic transducer film extending at least across a top surface of the electrically-conductive terminal piece, and having a width larger than a width of the electrically-conductive terminal piece; and an upper electrically-conductive lead layer contacting an upper surface of the electromagnetic transducer film.

2. The current-perpendicular-to-the-plane structure electromagnetic transducer element according to claim 1, wherein said electromagnetic transducer film is formed on a flat surface continuously defined on the top surface of the electrically-conductive terminal piece and an upper surface of the insulation layer.

3. The current-perpendicular-to-the-plane structure electromagnetic transducer element according to claim 2, wherein said electromagnetic transducer film comprises either a spin valve magnetoresistive film or a tunnel-junction magnetoresistive film.

4. The current-perpendicular-to-the-plane structure electromagnetic transducer element according to claim 3, wherein said lower electrically-conductive lead layer functions as a magnetic shield layer for the electromagnetic transducer film.

5. The current-perpendicular-to-the-plane structure electromagnetic transducer element according to claim 4, wherein said upper electrically-conductive lead layer comprises a terminal bump contacting the electromagnetic transducer film by a width smaller than that of said electromagnetic transducer film.

* * * * *